United States Patent
Yao et al.

(10) Patent No.: US 11,538,244 B2
(45) Date of Patent: Dec. 27, 2022

(54) EXTRACTION OF SPATIAL-TEMPORAL FEATURE REPRESENTATION

(71) Applicant: Microsoft Technology Licensing, LLC, Redmond, WA (US)

(72) Inventors: Ting Yao, Beijing (CN); Tao Mei, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/642,660

(22) PCT Filed: Jun. 22, 2018

(86) PCT No.: PCT/US2018/038874
§ 371 (c)(1),
(2) Date: Feb. 27, 2020

(87) PCT Pub. No.: WO2019/055093
PCT Pub. Date: Mar. 21, 2019

(65) Prior Publication Data
US 2020/0257902 A1 Aug. 13, 2020

(30) Foreign Application Priority Data
Sep. 18, 2017 (CN) .......................... 201710841936.0

(51) Int. Cl.
*G06K 9/62* (2022.01)
*G06V 20/40* (2022.01)
(Continued)

(52) U.S. Cl.
CPC ........... *G06V 20/46* (2022.01); *G06K 9/6217* (2013.01); *G06N 3/08* (2013.01); *G06V 10/40* (2022.01)

(58) Field of Classification Search
CPC .... G06K 9/00744; G06K 9/46; G06K 9/6217; G06K 9/4628; G06K 9/00711; G06N 3/08; G06N 3/0454
See application file for complete search history.

(56) References Cited

U.S. PATENT DOCUMENTS 9,729,442 B1 8/2017 Stark et al.
2007/0189186 A1 8/2007 Freeburg
(Continued)

FOREIGN PATENT DOCUMENTS

CN 106845381 A 6/2017

OTHER PUBLICATIONS

Li, Qing, et al. "Action recognition by learning deep multi-granular spatio-temporal video representation." Proceedings of the 2016 ACM on International Conference on Multimedia Retrieval. 2016. https://dl.acm.org/doi/abs/10.1145/2911996.2912001 (Year: 2016).*

(Continued)

*Primary Examiner* — Claire X Wang
*Assistant Examiner* — Han Hoang
(74) *Attorney, Agent, or Firm* — Schwegman Lundberg & Woessner, P.A.

(57) ABSTRACT

Implementations of the subject matter described herein provide a solution for extracting spatial-temporal feature representation. In this solution, an input comprising a plurality of images is received at a first layer of a learning network. First features that characterize spatial presentation of the images are extracted from the input in a spatial dimension using a first unit of the first layer. Based on a type of a connection between the first unit and a second unit of the first layer, second features at least characterizing temporal changes across the images are extracted from the first features and/or the input in a temporal dimension using the second unit. A spatial-temporal feature representation of the (Continued)

images is generated partially based on the second features. Through this solution, it is possible to reduce learning network sizes, improve training and use efficiency of learning networks, and obtain accurate spatial-temporal feature representations.

19 Claims, 5 Drawing Sheets

(51) Int. Cl.
*G06N 3/08* (2006.01)
*G06V 10/40* (2022.01)

(56) References Cited

U.S. PATENT DOCUMENTS

| | | | |
|---|---|---|---|
| 2009/0221292 | A1 | 9/2009 | Lundh et al. |
| 2009/0271412 | A1 | 10/2009 | Lacapra et al. |
| 2009/0318088 | A1 | 12/2009 | Wu et al. |
| 2012/0151473 | A1 | 6/2012 | Koch et al. |
| 2012/0260296 | A1 | 10/2012 | Mallet et al. |
| 2013/0148668 | A1 | 6/2013 | Kean et al. |
| 2014/0297775 | A1 | 10/2014 | Davda et al. |
| 2016/0188527 | A1 | 6/2016 | Cherian et al. |
| 2017/0034268 | A1 | 2/2017 | Govind |
| 2017/0371835 | A1 | 12/2017 | Ranadive et al. |
| 2018/0032846 | A1* | 2/2018 | Yang ................. G06K 9/4604 |
| 2018/0246756 | A1 | 8/2018 | Abali et al. |
| 2019/0079897 | A1 | 3/2019 | Kochevar-cureton et al. |
| 2019/0081899 | A1 | 3/2019 | Mundkur et al. |

OTHER PUBLICATIONS

"Notice of Allowance Issued in U.S. Appl. No. 15/824,925", dated Aug. 5, 2019, 9 Pages.
"Non Final Office Action Issued in U.S. Appl. No. 15/907,546", dated Oct. 3, 2019, 14 Pages.
Auduno, "DeepDraw", Retrieved From: https://github.com/auduno/deepdraw, Jun. 19, 2016, 2 Pages.
Derpanis, et al., "Dynamic Scene Understanding: The Role of Orientation Features in Space and Time in Scene Classification", in Proceedings of IEEE Conference on Computer Vision and Pattern Recognition, Jun. 16, 2012, pp. 1306-1313.
Feichtenhofer, et al., "Bags of Space-time Energies for Dynamic Scene Recognition", in Proceedings of the IEEE Conference on Computer Vision and Pattern Recognition, Jun. 23, 2014, pp. 2681-2688.
Feichtenhofer, et al., "Convolutional Two-Stream Network Fusion for Video Action Recognition", in Proceedings of the IEEE Conference on Computer Vision and Pattern Recognition, Jun. 27, 2016, pp. 1933-1941.
Firestone, Daniel, "VFP: A Virtual Switch Platform for Host SDN in the Public Cloud", in Proceedings of the 14th USENIX Symposium on Networked Systems Design and Implementation, Mar. 27, 2017, pp. 315-328.
Guestrin, Carlos, et al., "Dimensionality Reduction PCA", Retrieved From: https://courses.cs.washington.edu/courses/csep546/14wi/slides/pca-neuralnets-annotated.pdf, Feb. 18, 2014, 62 Pages.
He, et al., "Deep Residual Learning for Image Recognition", in Proceedings of the IEEE Conference on Computer Vision and Pattern Recognition, Jun. 27, 2016, pp. 770-778.
Heilbron, et al., "Activitynet: A large-scale Video Benchmark for Human Activity Understanding", in Proceedings of the IEEE Conference on Computer Vision and Pattern Recognition, Jun. 7, 2015, pp. 961-970.
Ji, et al., "3D Convolutional Neural Networks for Human Action Recognition", in Journal of IEEE Transactions on Pattern Analysis and Machine Intelligence, vol. 35, Issue 1, Jan. 2013, pp. 221-231.
Karpathy, et al., "Large-Scale Video Classification with Convolutional Neural Networks", in Proceedings of IEEE Conference on Computer Vision and Pattern Recognition, Jun. 23, 2014, pp. 1725-1732.
Klaser, et al., "A Spatio-Temporal Descriptor Based on 3D-Gradients", in Proceedings of the British Machine Vision Conference, Sep. 1, 2008, 10 Pages.
Kliper-Gross, et al., "Motion Interchange Patterns for Action Recognition in Unconstrained Videos", in Proceedings of European Conference on Computer Vision, Oct. 7, 2012, pp. 256-269.
Kliper-Gross, et al., "The Action Similarity Labeling Challenge", in Journal of IEEE Transactions on Pattern Analysis and Machine Intelligence, vol. 34, Issue 3, Mar. 2012, pp. 615-621.
Krizhevsky, et al., "ImageNet Classification with Deep Convolutional Neural Networks", in Proceedings of 26th Annual Conference on Neural Information Processing Systems, Dec. 3, 2012, 9 Pages.
Laptev, et al., "Learning Realistic Human Actions from Movies", in Proceedings of IEEE Conference on Computer Vision and Pattern Recognition, Jun. 23, 2008, 8 Pages.
Laptev, Ivan, "On Space-Time Interest Points", Published in International Journal of Computer Vision, vol. 64, Issue 2-3, Jun. 2005, pp. 107-123.
Maaten, et al., "Visualizing Data Using t-SNE", in Journal of Machine Learning Research, vol. 9, Nov. 2008, pp. 2579-2605.
Ng, et al., "Beyond Short Snippets: Deep Networks for Video Classification", in Proceedings of IEEE Conference on Computer Vision and Pattern Recognition, Jun. 7, 2015, pp. 4694-4702.
Zhu, et al., "A Key Volume Mining Deep Framework for Action Recognition", in Proceedings of IEEE Conference on Computer Vision and Pattern Recognition, Jun. 27, 2016, pp. 1991-1999.
"International Search Report and Written Opinion Issued in PCT Application No. PCT/US2018/038874", dated Sep. 27, 2018, 13 Pages.
"International Search Report & Written Opinion Issued in PCT Application No. PCT/US2018/039638", dated Sep. 10, 2018, 13 Pages.
"International Search Report & Written Opinion Issued in PCT Application No. PCT/US2018/039640", dated Sep. 10, 2018, 12 Pages.
Peng, et al., "Large Margin Dimensionality Reduction for Action Similarity Labeling", in Journal of IEEE Signal Processing Letters, vol. 21, Issue 8, Aug. 2014, pp. 1022-1025.
Perronnin, et al., "Improving the Fisher Kernel for Large-Scale Image Classification", in Proceedings of European Conference on Computer Vision, Sep. 5, 2010, pp. 143-156.
Qiu, et al., "Learning Spatio-Temporal Representation with Pseudo-3D Residual Networks", in Proceedings ofthe IEEE International Conference on Computer Vision, Oct. 22, 2017, pp. 5534-5542.
Scovanner, et al., "A 3-Dimensional SIFT Descriptor and its Application to Action Recognition", in Proceedings of the 15th ACM International Conference on Multimedia, Sep. 23, 2007, pp. 357-360.
Shao, et al., "Slicing Convolutional Neural Network for Crowd Video Understanding", in Proceedings ofthe IEEE Conference on Computer Vision and Pattern Recognition, Jun. 27, 2016, pp. 5620-5628.
Shroff, et al., "Moving Vistas: Exploiting Motion for Describing Scenes", in Proceedings of IEEE Computer Society Conference on Computer Vision and Pattern Recognition, Jun. 13, 2010, pp. 1911-1918.
Simonyan, et al., "Two-Stream Convolutional Networks for Action Recognition in Videos", in Proceedings of Annual Conference on Neural Information Processing Systems, Dec. 8, 2014, 9 pages.
Simonyan, et al., "Very Deep Convolutional Networks for Large-Scale Image Recognition", in Proceedings of 3rd International Conference on Learning Representations, May 7, 2015, 14 Pages.
Soomro, et al., "UCF101: A Dataset of 101 Human Actions Classes from Videos in the Wild", in Technical Report of Center for Research in Computer Vision-TR-12-01, Nov. 2012, 7 Pages.
Srivastava, et al., "Unsupervised Learning of Video Representations Using LSTMs", in Proceedings of 32nd International Conference on Machine Learning, Jul. 6, 2015, 10 Pages.

(56) References Cited

OTHER PUBLICATIONS

Sun, et al., "Human Action Recognition using Factorized Spatio-Temporal Convolutional Networks", in Proceedings of the IEEE International Conference on Computer Vision, Dec. 7, 2015, pp. 4597-4605.

Szegedy, et al., "Going Deeper with Convolutions", in Proceedings of IEEE Conference on Computer Vision and Pattern Recognition, Jun. 7, 2015, 9 pages.

Theriault, et al., "Dynamic Scene Classification: Learning Motion Descriptors with Slow Features Analysis", in Proceedings of IEEE Conference on Computer Vision and Pattern Recognition, Jun. 23, 2013, 8 Pages.

Tonsing, Johann, "OVS Acceleration Using Network Flow Processors", Retrieved From: http://www.openvswitch.org/support/ovscon2014/18/1300-ovs-accel-nfp-2014-11-18.pdf, Nov. 18, 2014, 23 Pages.

Tran, et al., "Learning Spatiotemporal Features with 3D Convolutional Networks", in Proceedings of IEEE International Conference on Computer Vision, Dec. 7, 2015, pp. 4489-4497.

Varol, et al., "Long-Term Temporal Convolutions for Action Recognition", in Composite Repository of arXiv:1604.04494v1, Apr. 15, 2016, 18 Pages.

Wang, et al., "Action Recognition by Dense Trajectories", in Proceedings of Conference on Computer Vision and Pattern Recognition, Jun. 20, 2011, pp. 3169-3176.

Wang, et al., "Action Recognition with Improved Trajectories", in Proceedings of the IEEE International Conference on Computer Vision, Dec. 1, 2013, 8 Pages.

Wang, et al., "Action Recognition with Trajectory-Pooled Deep-Convolutional Descriptors", in Proceedings of IEEE Conference on Computer Vision and Pattern Recognition, Jun. 7, 2015, pp. 4305-4314.

Wang, et al., "Temporal Segment Networks: Towards Good Practices for Deep Action Recognition", in Proceedings of 14th European Conference on Computer Vision, Oct. 11, 2016, 16 Pages.

Weinzaepfel, et al., "Learning to Track for Spatio-Temporal Action Localization", in Proceedings of the IEEE International Conference on Computer Vision, Dec. 7, 2015, pp. 3164-3172.

Willems, et al., "An Efficient Dense and Scale-Invariant Spatio-Temporal Interest Point Detector", in Proceedings of 10th European Conference on Computer Vision, Oct. 12, 2008, 14 Pages.

Zhang, et al., "Polynet: A Pursuit of Structural Diversity in Very Deep Networks", in Compository Reposit of arXiv:1611.05725v1, Nov. 17, 2016, 9 pages.

"Office Action Issued in European Patent Application No. 18746334.4", dated Feb. 21, 2022, 6 Pages.

* cited by examiner

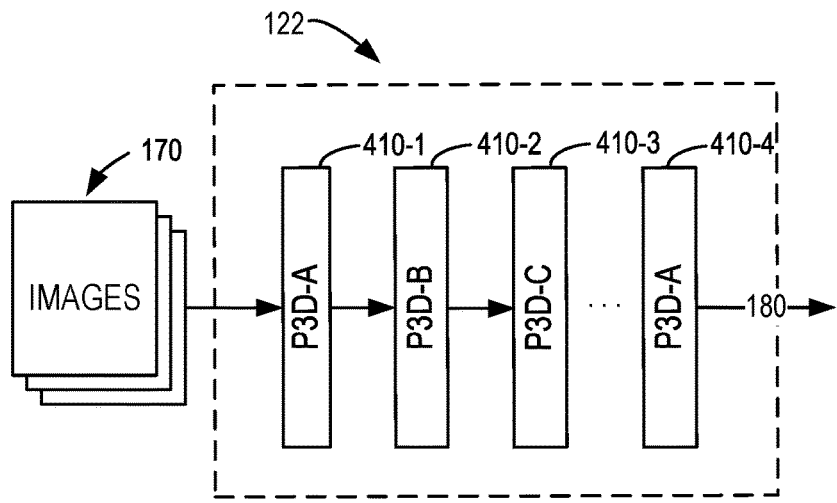
FIG. 4
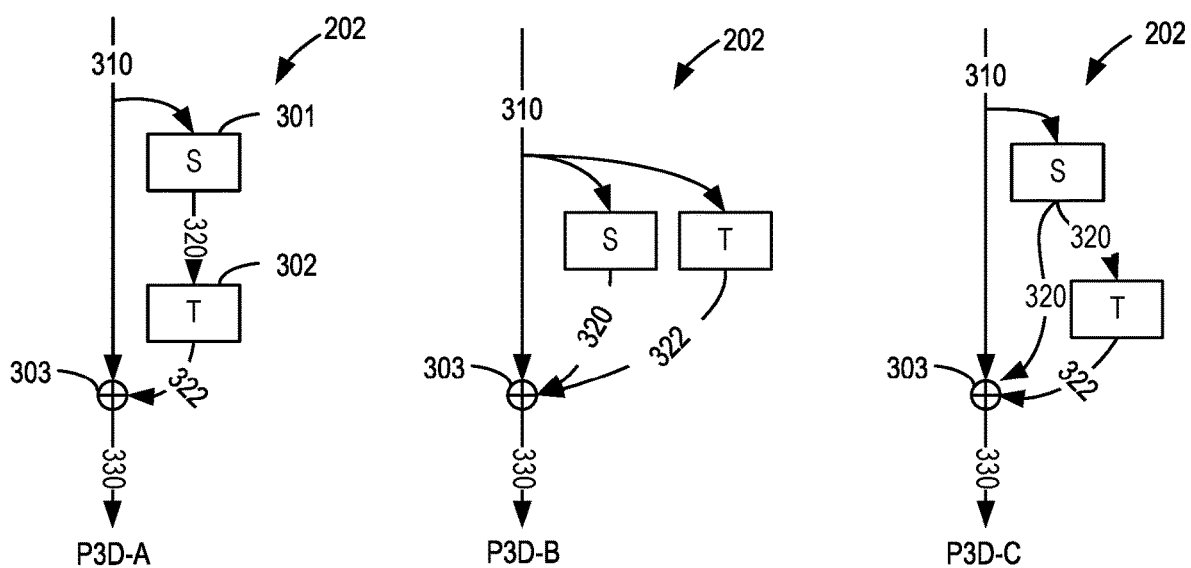
FIG. 5A  FIG. 5B  FIG. 5C

EXTRACTION OF SPATIAL-TEMPORAL FEATURE REPRESENTATION

CROSS-REFERENCE TO RELATED APPLICATION

This application is a U.S. National Stage Filing under 35 U.S.C. 371 of International Patent Application Serial No. PCT/CN2018/038874, filed Jun. 22, 2018, and published as WO 2019/055093 A1 on Mar. 21, 2019, which claims priority to Chinese Application No. 201710841936.0 on Sep. 18, 2017; which applications and publication are incorporated herein by reference in their entirety.

BACKGROUND

Multimedia contents, particularly images and videos, are frequently applied, for example, processed, transmitted, and stored between electronic devices. This has encouraged development and use of more advanced processing techniques in multimedia processing tasks. Images-based or video-based multimedia processing tasks include object recognition, action recognition, content classification, depth evaluation and so on. The fundamental progress underlying these tasks is usually to learn feature representation of images and video frames. Feature representation refers to feature information extracted from an image or video frame and characterizing the image or video frame. The expected processing target for the images or video can be completed based on the learnt feature representation.

At present, it has been found that the neural network (also referred to as a learning network) has good performance in learning visual feature representation in the field of images. Sometimes it is expected to extract feature representation of a video or a series of images that are captured consecutively. In some conventional solutions, the neural network designed for images may be directly used to extract the feature representation of each image or each frame of the video. However, different a static image, temporal dynamic changes in a group of consecutive images or a plurality of frames of video should be considered in the feature representation. For this reason, in some other solutions, the neural network may be designed more complicatedly to extract the feature information from a video and a group of images in both the spatial and temporal dimensions. This requires more processing resources and storage resources for the training, storage and use of the neural network.

SUMMARY

In accordance with implementations of the subject matter described herein, a solution of extracting a spatial-temporal feature representation is provided. In this solution, an input is received at a first layer of a learning network, the input comprising a plurality of images. First features of the plurality of images are extracted from the input in a spatial dimension using a first unit of the first layer, the first features characterizing a spatial presentation of the plurality of images. Based on a type of a connection between the first unit and a second unit in the first layer, second features of the plurality of images are extracted from at least one of the first features and the input in a temporal dimension using the second unit, the second features at least characterizing temporal changes across the plurality of images. A spatial-temporal feature representation of the plurality of images is generated based at least in part on the second features. Through this solution, it is possible to reduce the size of the learning network, improve the training and use efficiency of the learning network, and at the same time obtain the accurate spatial-temporal feature representation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 illustrates a block diagram of a feature extracting system in accordance with some other implementations of the subject matter described herein;

FIGS. 5A to 5C illustrate block diagrams of example structures for the processing kernel in the system of FIG. 2 in accordance with some other implementations of the subject matter described herein;

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Example Environment

Figure 1:
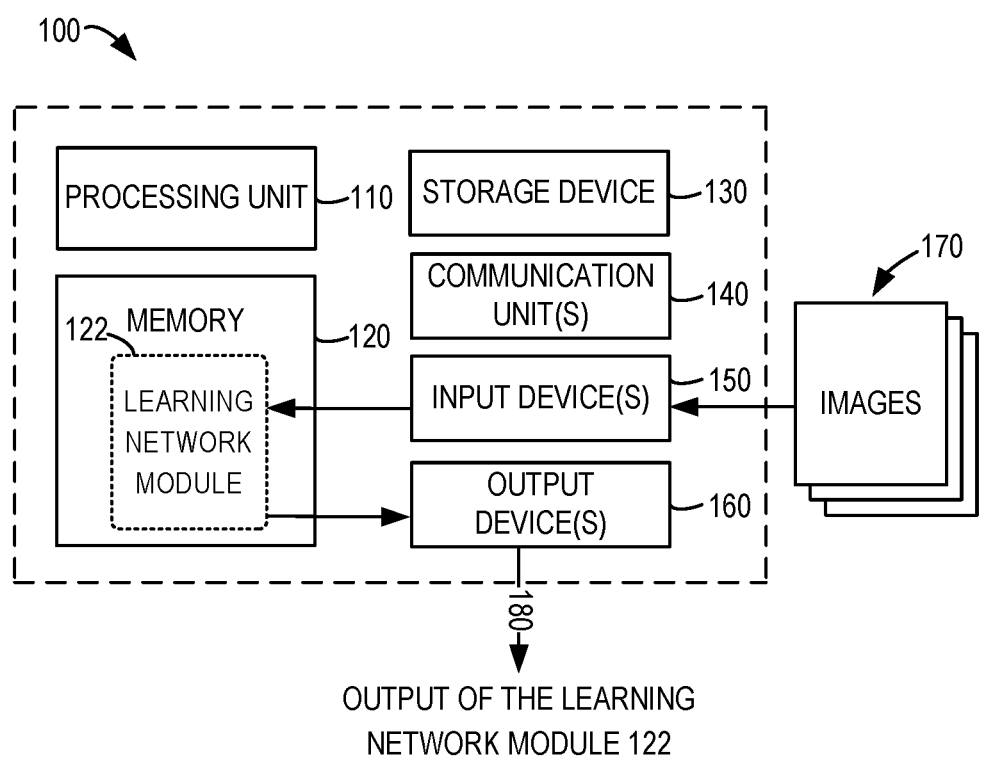
FIG. 1 illustrates a block diagram of a computing device in which implementations of the subject matter described herein can be implemented.

FIG. 1 illustrates a block diagram of a computing device 100 in which implementations of the subject matter described herein can be implemented. It would be appreciated that the computing device 100 shown in FIG. 1 is merely for illustration but will be considered as any limitation to the function and scope of implementations of the subject matter described herein in any manners. As shown in FIG. 1, the computing device 100 includes a computing device 100 in form of general-purpose computing device. Components of the computing device 100 may include, but are not limited to, processor(s) or processing unit(s) 110, a memory 120, a storage device 130, a communication unit(s) 140, an input device(s) 150, and an output device(s) 160.

In some implementations, the computing device 100 may be implemented as any user terminal or service terminal having a computing capability. The service terminal may be a server or large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, a plurality of processing units execute computer executable instructions in parallel so as to improve parallel processing capability of the computing device 100. The processing unit 110 may also be referred to as a central processing unit (CPU), a microprocessor, a controller and a microcontroller.

The computing device 100 typically includes various computer storage medium. The computer storage medium can be any medium accessible by the computing device 100, including but not limited to volatile and non-volatile medium, or detachable and non-detachable medium. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 may include a learning network module 122, and these program modules 122 are configured to perform functions of various implementations described herein. The learning network module 122 can be accessed and operated by the processing unit 110 to implement corresponding functions.

The storage device 130 can be any detachable or non-detachable medium and may include machine-readable medium, which can be used for storing information and/or data and can be accessed in the computing device 100. The computing device 100 may further include additional detachable/non-detachable, volatile/non-volatile memory medium. Although not shown in FIG. 1, it is possible to provide a disk drive for reading from or writing into a detachable and non-volatile disk and a disc drive is provided for reading and writing a detachable non-volatile disc. In such cases, each drive may be connected to a bus (not shown) via one or more data medium interfaces.

The communication unit 140 communicates with a further computing device via the communication medium. In addition, the functions of components in the computing device 100 can be implemented by a single computing cluster or multiple computing machines that can communicate via communication connections. Therefore, the computing device 100 can operate in a networked environment using a logical connection with one or more other servers, network personal computers (PCs) or further general network nodes.

The input device 150 may include one or more of a variety of input devices, such as a mouse, keyboard, tracking ball, voice-input device, and the like. The output device 160 may include one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some implementations, as an alternative of being integrated on a single device, some or all components of the computing device 100 may also be arranged in form of cloud computing architecture. In the cloud computing architecture, the components may be remotely provided and work together to implement the functions described in the subject matter described herein. In some implementations, cloud computing provides computing, software, data access and storage serviced, which will not require the end users be aware of the physical positions or configurations of the systems or hardware providing these services. In various implementations, cloud computing uses a proper protocol to provide the services via a wide area network (such as Internet). For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they are exposed as a single access point for the users. Therefore, the cloud computing architecture may be used to provide components and functions described herein from a service provider at a remote location. Alternatively, they may be provided from a conventional server or installed directly or otherwise on a client.

The computing device 100 may be used to implement extraction of a video feature representation in implementations of the subject matter described herein. When extracting a video feature representation, the computing device 100 may receive a plurality of input images 170 via the input device 150. The images 170 may be a plurality of frames (e.g., a plurality of sequential frames) in a video clip. In some other examples, the images 170 may be a group of images obtained consecutively by capturing a scenario or event. The group of images therefore may be considered as a dynamic clip of the scenario or event. Below discussion will be made by taking a plurality of frames of a video clip as an example of the images 170.

The processing unit 110 of the computing device 100 may learn a feature representation of the input 170 by executing the learning network module 122. The computing device 100 may output the feature representation as an output 180 via the output device 160. In other implementations, the processing device 110 of the computing device 100 may further execute the learning network module 122 or other modules to perform further video processing tasks based on the feature representation of the input 170, for example, to recognize objects and object actions in the input 170, to classify the input 170, or the like.

As mentioned above, when processing video-related tasks, each frame of the video may be considered as an image, and then a learning network will be designed for video task processing in a manner similar to image processing. For a group of consecutive images, a learning network related to the image processing may also be used to process each of the images individually. Typically, the learning network may be designed as a convolutional neural network (CNN) that has great performance in image processing. CNN includes convolutional layers each having a plurality of convolutional kernels for performing convolutional operations on the input. For each frame, CNN may extract spatial presentation in the 2D spatial dimension of the frame as a feature representation of the frame. Such spatial presentation may include visual features presented in the frame, including but not limited to feature information such as object profiles, colors, gray scales, edges, corners and the like.

However, the design of the above 2D learning network cannot capture dynamic changes among a plurality of frames of video or a group of images, namely, the features in the temporal dimension. Therefore, a learning network is developed to process the video. The learning network may simultaneously extract the visual presentation of each frame of the video clip and the temporal changes across a plurality of frames as a feature representation of the video clip. Such learning network is also referred to as a 3D CNN, where the convolutional layers include one or more 3D convolutional kernels for performing 3D convolution on the input video to facilitate extraction of the feature representation in both the spatial dimension and the temporal dimension. Although it has already been proved that the 3D CNN has some advantages in performance, the training of 3D CNN will consume a large amount of computing resources, and the network size will increase exponentially as compared with 2D CNN. Due to these reasons, it is generally difficult to train a very deep 3D CNN.

A further solution that can take temporal-dimensional features of a plurality of frames or images into account is: first using a 2D CNN to extract a feature representation of a plurality of frames in a video clip, and then using a pooling strategy or a Recurrent Neural Network (RNN) to process the feature representation so as to generate a final feature representation of the video clip. However, since the temporal connections are built on the basis of the output of higher layers (such as the last pooling layer or the fully-connected layer) of the 2D CNN, some correlations in the low-level forms (e.g., corners or edges at the bottom layers of the CNN) are not fully exploited. This makes the final feature representation fail to fully characterize the features of the video clip in the temporal dimension.

According to implementations of the subject matter described herein, there is provided a solution for extracting a feature representation of a video clip or dynamic images in both the spatial dimension and the temporal dimension. The solution performs feature extraction based on a learning network. The learning network includes separate units that are used respectively for extracting features of a plurality of images (e.g., a plurality of frames of the video clip) in a spatial dimension and other features of the plurality of images in a temporal dimension. Depending on whether there is a parallel connection or a series connection between these units, the features may interact with each other correspondingly to generate a spatial-temporal feature representation. In this way, the size of the learning network is substantially reduced so that the learning network can be easily trained and used, and in the meantime an accurate spatial-temporal feature representation can be obtained.

Various implementations of the subject matter described herein are further described through specific examples. In the implementations of the subject matter described herein, the learning network may also be referred to as "neural network" or "learning model". Hereinafter, the terms "learning model", "learning network", "neural network", "model" and "network" can be used interchangeably.

System Architecture and Work Principle

Figure 2:
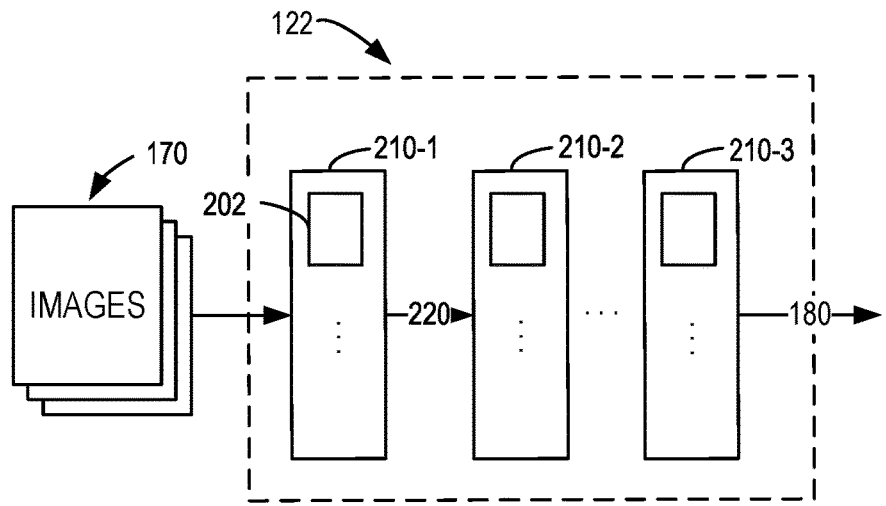
FIG. 2 illustrates a block diagram of a system for feature extraction in accordance with some implementations of the subject matter described herein.

Reference is now made to FIG. 2, which illustrates a block diagram of a system for extracting a feature representation of a video in accordance with some implementations of the subject matter described herein. The system may be considered as a learning network 122 and may be implemented at the learning network module 122 of the computing device 100 of FIG. 1. As shown in FIG. 2, the learning network 122 includes a plurality of layers 210-1, 210-2 and 210-3 (also collectively or individually referred to as layers 210). A layer 210 performs corresponding processing on its input and provides the output to a next layer for further processing. The first layer (e.g., the layer 210-1) of the learning network 122 receives a plurality of frames 170 of a video clip as input, and an output feature representation 180 of the last layer of the learning network 122 is considered as a feature representation of the plurality of frames 170 of the video clip. Except for the input 170 and the output 180 of the learning network 122, the feature representation 220 transferred between any two layers 210 is referred to as an intermediate feature representation.

Each layer 210 may include one or more processing kernels 202 to process its input. In some implementations, the learning network 122 may be designed based on a convolutional neural network (CNN). Each layer 210 may include one or more convolutional kernels (also referred to as convolutional filters) for performing convolutional operations on the input of the layer to generate the output. The structure of a processing kernel 202 will be described in detail with reference to FIG. 3A to FIG. 3C. For purpose of description, the implementations of the subject matter described herein will be described hereinafter based on the CNN. However, it would be appreciated that the learning network 122 may also be designed based on other neural network architectures.

The output feature representation 180 and the intermediate feature representation 220 may be in form of one or more feature maps. The size of each feature map output by the layer 210 has the same size as the input feature map or video frame of the layer (depending on the location of the layer 210). The number of feature maps output by each layer 210 may be associated with the number of channels of each of the video frames 170 and the number of convolutional kernels included in the layer. The dimensionality of the input of each layer 210 depends on the number of frames and the frame size of the video frames 170 (if the input are video frames) or the number of features maps output by the preceding layer 210 as well as the size of each feature map (if the input is the output of the preceding layer). Since each feature map may also be represented in two dimensions, although the feature map may only characterize the feature information in a certain aspect of one or more frames 170, each feature map may also be considered as one image or frame. In other words, the intermediate feature representation 220 may also be considered as a plurality of features maps or a plurality of processed frames.

In some implementations, in addition to the convolutional layers 210, the learning network 122 may further include one or more activation layers (consisting of nonlinear activation functions, for example, ReLU functions) and/or pooling layers (both not shown). These layers may be provided between any two layers 210 to receive the intermediate feature representation (or processed frame) 220 output by a preceding layer 210 and to process the intermediate feature representation as the input of a next layer 210. An activation layer is used to perform nonlinear transformation on the intermediate feature representation 220. A pooling layer is used to perform downsampling on the intermediate feature representation 220 to change the size of the intermediate feature representation 220. The learning network 122 may further include a fully-connected layer to combine all inputs of the layer. Usually, the fully-connected layer may be provided as the last layer of the learning network 122.

Example Structures of Processing Kernel

Different from a conventional neural network which employs 3D convolutional kernels to extract features of the spatial dimension and temporal dimension simultaneously, according to the implementations of the subject matter described herein, each processing kernel 202 of the layer 210 includes two separate units (also referred to as convolutional kernels) each for extracting features of the plurality of frames 170 of the video clip from the spatial dimension or the temporal dimension. The final feature representation 180 of the plurality of frames 170 may be generated based on such feature extraction. Since the features of the plurality of frames 170 in both the spatial dimension and the temporal dimension are characterized, the feature representation 180 may also be referred to as a spatial-temporal feature representation.

To better understand the implementations of the subject matter described herein, a conventional 3D convolutional kernel is first described briefly hereinafter. Given a video clip with a size of c×l×h×w (where c, l, h and w represent the number of channels, the clip length (number of frames), the height and width of each frame, respectively), if the neural network including 3D convolutional kernels is used to extract the feature representation, each 3D convolutional kernel performs 3D convolution on the input in both the spatial dimension and the temporal dimension to extract simultaneously the spatial presentation of the frames and temporal changes across the frames. Parameters of a 3D convolutional kernel may be represented as $d \times k_1 \times k_2$, where d represents the temporal depth of the convolutional kernel (e.g., the number of frames on which the convolution is performed each time), and $k_1$ and $k_2$ represent the spatial size of the convolution kernel (e.g., the size of the sampling batch in each frame for performing convolution each time). In some examples, $k_1$ and $k_2$ may be equal, for example, may be both represented as k.

In implementations of the subject matter described herein, instead of directly using a $d \times k_1 \times k_2$ 3D convolution kernel, two separate units may be used to perform convolutional operations on the input of each convolutional layer in the spatial dimension and temporal dimension, respectively. The size of the unit used for performing feature extraction in the spatial dimension may be represented as $1 \times k_1 \times k_2$, of which the temporal depth is 1, which means that the unit performs 2D convolution in a 2D space of a single frame each time. In this way, such unit may be referred to as a spatial unit, spatial convolutional kernel, or 2D convolutional kernel. The size of the other unit used for performing feature extraction in the temporal dimension may be represented as d×1×1, of which the temporal depth is d, which means that the unit performs one-dimensional convolution on a plurality of (consecutive) frames in the temporal dimension each time without requiring to extract the feature of each frame in the spatial dimension. The unit used for performing convolution in the temporal dimension may also be referred to as a temporal unit, temporal convolutional kernel, or 1D convolutional kernel. Generally speaking, in the implementations of the subject matter described herein, a 3D convolutional kernel of $d \times k_1 \times k_2$ is divided into a 2D convolutional kernel of $1 \times k_1 \times k_2$ and a 1D convolutional kernel of d×1×1 to perform the feature extraction in the spatial dimension and the temporal dimension. Such separate convolution may also be referred to as pseudo-3D (P3D) convolution.

In the learning network 122 of FIG. 2, each processing kernel 202 may include two types of units, namely, a spatial 2D convolution kernel and a temporal 1D convolutional kernel. In some implementations, two different types of units may be connected with each other in different types of connection. The connection of the two units may be at least based on the following two aspects. A first aspect is about whether the two types of units should directly or indirectly influence each other. Direct influence between the two types of units means that the spatial 2D convolutional kernel and the temporal 1D convolutional kernel are connected in series, and the output of the 2D convolutional kernel is provided as the input to the 1D convolutional kernel. Indirect influence between the two types of units means that the two units are connected in parallel and each type of unit performs operation on the input of the corresponding convolutional layer independently. A further aspect is about whether the outputs of two types of units should both directly influence the final output of the corresponding convolutional layer. Based on the above aspects, FIG. 3A to FIG. 3C show some example connections of the two types of units in each processing kernel 202, which are represented as P3D-A, P3D-B, and P3D-C, respectively.

Figures 3A, 3B, 3C:
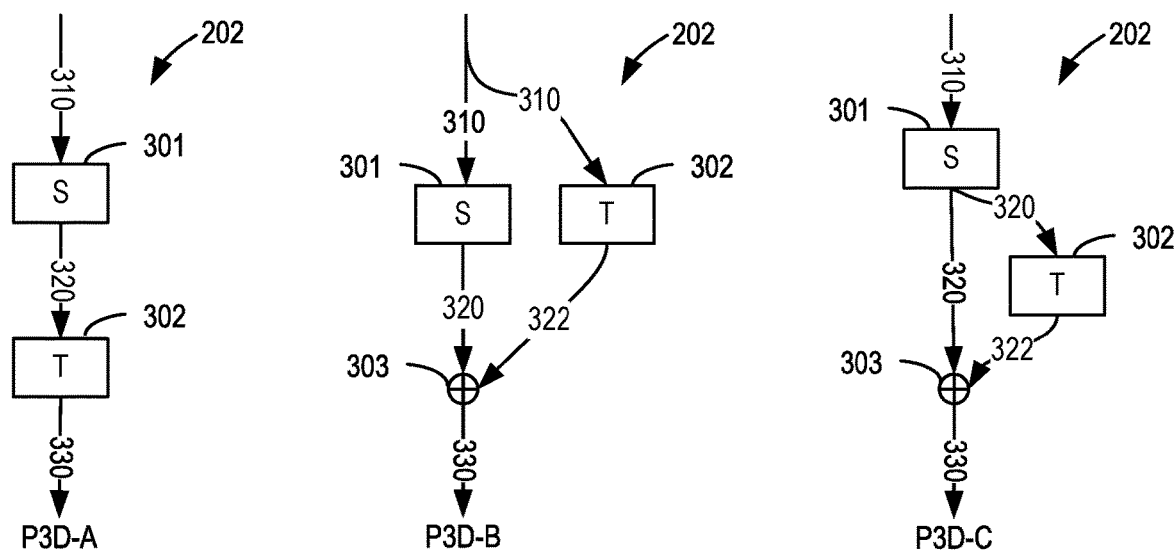
FIGS. 3A to 3C illustrate block diagrams of example structures for the processing kernel in the system of FIG. 2 in accordance with some implementations of the subject matter described herein.

As shown in FIG. 3A, the processing kernel 202 includes a spatial 2D convolutional kernel 301 (represented as S) and a temporal 1D processing kernel 302 (represented as T) which are connected in series. The series connection in the example of FIG. 3A may be referred to as a first series connection. In this kind of connection, the convolutional kernels 301 and 302 directly influence each other, and only the output of the convolutional kernel 302 directly influences the output of the convolutional layer 210 in which the processing kernel 202 is included. Specifically, after the convolutional layer 210 in which the processing kernel 202 is included receives an input 310, the convolutional kernel 301 extracts first features 320 for the plurality of frames 170 of the video clip from the input 310 in the spatial dimension. Specifically, the convolutional kernel 301 may extract a first feature for each of the frames 170 separately. The first features 320 characterizes a spatial presentation of the plurality of frames, for example, the visual features presented in the respective frames, which include, but are not limited to, visual feature information such as object profiles, colors, gray scales, edges, corners, and the like. The first features may be represented as one or more feature maps. Depending on the location of the convolutional layer 210 in the learning network 122, the input 310 may be the plurality of frames 170 of the video clip, or may be frames processed by a preceding layer 210 (namely, the intermediate feature representation 220).

The convolutional kernel 302 receives the first features 320 and extracts second features 330 from the first features 320 in the temporal dimension. Since the convolutional kernel 302 performs the convolutional operation across two or more frames in time, the second features 330 at least characterizes temporal changes across the plurality of frames 170 of the video clip. Such temporal changes may for example include changes of object actions, background changes, or other changes in the plurality of frames. The second features may be represented as one or more feature maps. Furthermore, since the convolutional kernel 302 performs processing on the basis of the first features 320 that characterize the spatial presentation, the second features 330 may also characterize the spatial presentation of the plurality of frames 170 of the video clip. In the example of FIG. 3A, the second features 330 may be considered as the output of the processing kernel 202. As such, the second features 330 may serve as the output of the corresponding layer 210, for example, the intermediate feature representation 220 or the spatial-temporal feature representation 180 of the learning network 122.

In some implementations, it is assumed that the convolutional layer where the processing kernel 202 is included is a convolutional layer t, the input 310 is represented as $x_t$, and the output 330 of the layer may be represented as $x_{t+1}$. The processing in the processing kernel 202 is represented as:

$$x_{t+1}=F(x_t) \qquad (1)$$

where F represents an overall processing operation in the convolutional layer t. In the example of FIG. 3A, if it is assumed that the processing operation of the convolutional kernel 301 is S and the processing operation of the convolutional kernel 302 is T, the above Equation (1) may be represented as $$x_{t+1}=T(S(x_t)) \qquad (2)$$

In FIG. 3B, the two convolutional kernels 301 and 302 of the processing kernel 202 are connected in parallel. In this kind of connection, the convolutional kernels 301 and 302 indirectly influence each other, and the outputs of the two convolutional kernels both directly influence the output of the convolutional layer 210 in which the processing kernel 202 is included. During the operation, internal convolutional operations of the convolutional kernels 301 and 302 are the same as those in FIG. 3A and the difference lies in that the convolutional kernels 301 and 302 both process the input 310 of the processing kernel 202. The convolutional kernel 301 extracts the first features 320 in the spatial dimension, while the convolutional kernel 302 extracts the second features 322 in the temporal dimension. Since the second features 322 are directly extracted from the input 310, those features only characterize the time changes across the plurality of frames. The processing kernel 202 further includes a combiner 303 for combining the first features 320 with the second features 322 to generate the output 330. Depending on the location of the convolutional layer 210 in which the convolutional kernel 202 is included, the output 330 may serve as the intermediate feature representation 220 of the learning network 122 for further processing or the spatial-temporal feature representation 180 of the learning network 122. In some implementations, the processing of the processing kernel 202 in FIG. 3B may be represented as:

$$x_{t+1}=S(x_t)+T(x_t) \qquad (3)$$

In FIG. 3C, the two convolutional kernels 301 and 302 of the processing kernel 202 are in another series connection (referred to as a second series connection). In this kind of connectional, the convolutional kernels 301 and 302 directly influence each other, and the outputs of both two convolutional kernels directly influence the output of the convolutional layer 210 in which the processing kernel 202 is included. Specifically, during the operation, the convolutional kernel 301 extracts the first features 320 from the input 310 in the spatial dimension. The convolutional kernel 302 receives the first features 320 and extracts the second features 322 from the first features 320 in the temporal dimension. In this example, the second features 322 not only characterize the temporal changes across the plurality of frames 170 of the video clip but also further characterize the spatial presentation of the plurality of frames. The processing kernel 202 further includes a combiner 303 for combining the first features 320 with the second features 322 to generate the output 330, which may serve as the intermediate feature representation 202 or the spatial-temporal feature representation 180. In some implementations, the processing of the processing kernel 202 in FIG. 3C may be represented as:

$$x_{t+1}=S(x_t)+T(S(x_t)) \qquad (4)$$

It has been described above some example connection structures of the spatial 2D convolutional kernel and temporal 1D convolutional kernel in the processing kernel 202 with reference to FIGS. 3A-FIG. 3C. It would be appreciated that in some other implementations, variations of other connection structures of the spatial 2D convolutional kernel and temporal 1D convolutional kernel may also be designed by taking in the above two aspects into account. In an example, on the basis of FIG. 3A, there may be another variant structure where the convolutional kernel 302 receives the first features 320 and the input 310 and then extracts the second features from the first features 320 and the input 310 as the output 330. On the basis of FIG. 3C, there may be another variant structure where the convolutional kernel 302 extracts the second features 322 from both of the first features 320 and the input 310 to generate the output 330.

In addition, although the connection of a single 2D convolutional kernel and a single 1D convolutional kernel is shown, in some examples, the input 310 of the processing kernel 202 may be processed by a plurality of 2D processing kernel 301 to obtain the first features 320. These convolutional kernels 301 may form a processing sub-layer in the processing kernel 202. Similarly, the input 310 or the first features 320 may be processed by a plurality of 1D convolutional kernels 302 to generate the second features 322 (or the output 330 in FIG. 3A). These convolutional kernels 302 may form a further processing sub-layer in the processing kernel 202.

Each convolutional layer 210 in the learning network 122 of FIG. 2 may include one or more processing kernel 202. In some implementations, in the respective processing kernels 202 of each convolutional layer 210, the two convolutional kernels 301 and 302 may be of the same connection type. In some other implementations, the connection types of the convolutional kernels 301 and 302 may be varied for the respective processing kernels 202 of each convolutional layer 210.

In some other implementations, the convolutional kernels 301 and 302 in different connection types may further be interleaved between the convolutional layers; that is to say, the processing kernels 202 in different convolutional layers 210 of the learning network 122 may have convolutional kernels 301 and 302 of different connection types. By mixing different types of processing kernels in the learning network 122, it is possible to enhance the structural diversity of the learning network 122, thereby improving the feature extracting performance.

FIG. 4 shows an example of such mixed learning network 122. In this example, the convolutional layer 410-1 of the learning network 122 includes P3D-A-type processing kernels as shown in FIG. 3A, the convolutional layer 410-2 includes P3D-B-type processing kernels as shown in FIG. 3B, the convolutional layer 410-3 includes P3D-C-type processing kernels as shown in FIG. 3C, and the convolutional layer 410-4 includes P3D-A-type processing kernels as shown in FIG. 3A. Other convolutional layers having the P3D-A-type, P3D-B-type or P3D-C-type processing kernels may also be provided in the learning network 122. It would be appreciated that FIG. 4 illustrates the structure of the mixed learning network 122 only by way of example. In other implementations, two or more different types of processing kernels may be included in the learning network 122 in other mixing manners.

The learning network 122 on the basis of the processing kernel 202 may be trained using various training data to determine the parameters of the learning network 122 so that the units in the processing kernel 202 may implement their corresponding functions. For example, in some implementations, training data related to the object recognition or action recognition may be used to train the learning network 122 as the results of the object or action recognition may also serve as a basis of many other video tasks. The training data may include training video clips and information indicative of the objects or actions in the respective training clips. For the purpose of training, the learning network 122 may further be expanded to include a result output (Softmax) layer to recognize the objects or actions based on the extracted feature representation. After the parameters of the convolutional layers for feature extraction are trained, the expanded Softmax layer may be discarded. In some implementations, other training data such as information indicative of the classes of the video contents and information indicative of image depths may also be used to train the learning network 122.

Expansion Based on Residual Neural Network

It has been described above the example implementations of decomposing a 3D convolutional kernel used in the conventional CNN architecture into the spatial 2D convolutional kernel and temporal 1D convolutional kernel. In the conventional CNN architecture, the layers are in a cascaded structure, and the output of one layer is the input to the next layer. In some other implementations, the learning network 122 may also be in a residual neural network (ResNet) structure. In this structure, after the respective convolutional kernels at a layer have processed the input, the input and the processing result of the convolution kernels are combined to generate the output of the layer. In this implementation, the convolutional kernels perform convolution based on a non-linear residual function. It is assumed that the input of the convolutional layer t is represented as $x_t$, then the output of the layer is represented as $x_{t+1}$ and may be obtained by the following equation:

$$x_{t+1}=h(x_t)+F(x_t) \quad (5)$$

where F represents an overall processing operation of the convolutional layer t, which may be a non-linear residual function; and h represents an identity mapping and $h(x_t)=x_t$. The above Equation (5) may also be rewritten as:

$$(I+F)\cdot x_t:=x_t+F\cdot x_t:=x_t+F(x_t)=x_{t+1} \quad (6)$$

where I represents an identity matrix, and $F\cdot x_t$ represents a result after performing the residual function on $x_t$. The main idea of the residual neural network is to learn the additive residual function F with reference to the unit inputs of the convolutional layer, which is realized through a shortcut connection, instead of directly learning unreferenced non-linear functions.

Currently, the residual neural network is mainly employed in a 2D CNN. In some implementations of the subject matter described herein, since the 3D convolutional kernel is decomposed into a spatial 2D convolutional kernel and a temporal 1D convolutional kernel, the architecture of the residual neural network may also be employed. To design the learning network 122 based on the residual neural network structure, it will be possible to train the learning network 122 more easily. In some implementations, the processing kernel 202 shown in FIGS. 3A-3C may be varied based on the structure of the residual neural network. FIGS. 5A-5C show some other examples of the processing kernel 202 of FIGS. 3A-3C, respectively.

In the example of FIG. 5A, the convolutional kernels 301 and 302 are in the series connection represented by P3D-A, and the processing in the two convolutional kernels is similar to the processing as in FIG. 3A. The difference lies in that in the example of FIG. 5A, the processing kernel 202 further includes the combiner 303 which combines the second features 322 output by the convolutional kernel 302 and the input 310 of the processing kernel 202 to generate the output 330. In this example, the processing in the processing kernel 202 may be represented as follows based on the above Equation (2) and Equation (6):

$$(I+T\cdot S)\cdot x_t:=x_t+T(S(x_t))=x_{t+1} \quad (7)$$

In the example of FIG. 5B, the convolutional kernels 301 and 302 are in the parallel connection represented by P3D-B, and the processing in the two convolutional kernels is similar to the processing as in FIG. 3B. The difference lies in that in the example of FIG. 5B, the combiner of the processing kernel 202 is used to combine the first features 320 and the second features 322 output by the convolutional kernels 301 and 302 together with the input 310 to obtain the output 330. In this example, the processing of the processing kernel 202 may be represented as follows based on the above Equation (3) and Equation (6):

$$(I+S+T)\cdot x_t:=x_t+S(x_t)+T(x_t)=x_{t+1} \quad (8)$$

In the example of FIG. 5C, the convolutional kernels 301 and 302 are in the series connection represented by P3D-C, and the processing in the two convolutional kernels is similar to the processing as in FIG. 3C. The difference lies in that in the example of FIG. 5B, the combiner of the processing kernel 202 is used to combine the first features 320 and the second features 322 output by the convolutional kernels 301 and 302 together with the input 310 to obtain the output 330. In this example, the processing of the processing kernel 202 may be represented as follows based on the above Equation (4) and Equation (6):

$$(I+S+T\cdot S)\cdot x_t:=x_t+S(x_t)+T(S(x_t))=x_{t+1} \quad (9)$$

In some implementations, the processing kernel 202 shown in FIG. 5A to FIG. 5C may be included in one or more convolutional layers 210 of the learning network 122 alternatively or in combination with the processing kernel 202 shown in FIG. 3A to FIG. 3C. In addition, different types (P3D-A to P3D-C) based on the residual neural network architecture may be mixed in different convolutional layers 210 in an interleaved manner.

In some other implementations, the processing kernel 202 based on the residual neural network architecture may also be modified as having a bottleneck design. Specifically, the dimensionality of the input 310 of the processing kernel 202 may be reduced, and then provided to the spatial 2D convolutional kernel 301 and/or the temporal 1D convolutional kernel 302 for processing. As mentioned above, the dimensionality of the input 310 may be determined at least based on the number of convolutional kernels in the preceding layer that provides the input 310, the number of channels of the frames 170 in the video chip, and/or the frame size. If the input 310 is the frames 170 of the video clip, the dimensionality may be determined from the number of channels of the frame. The dimensionality of the output obtained based on the second features output by the convolutional kernel 302 (in some cases, further based on the first features output by the convolutional kernel 302) may be increased, and then combined with the input 310 to generate the output 330 of the processing kernel 202. The dimensionality of the first features or second features may also be determined at least based on the number of convolutional kernels in the layer before the convolutional kernel 301 or 302, the number of channels and/or the size of the input to the convolutional kernel.

Figure 6A:
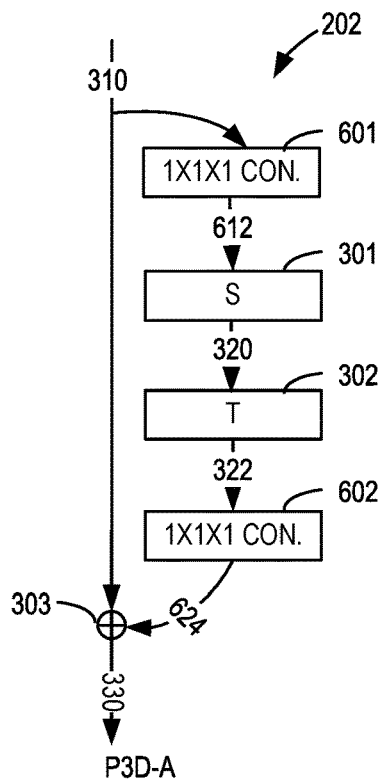
FIGS. 6A to 6C illustrate block diagrams of example structures for the processing kernel in the system of FIG. 2 in accordance with some further implementations of the subject matter described herein.
Figure 6B:
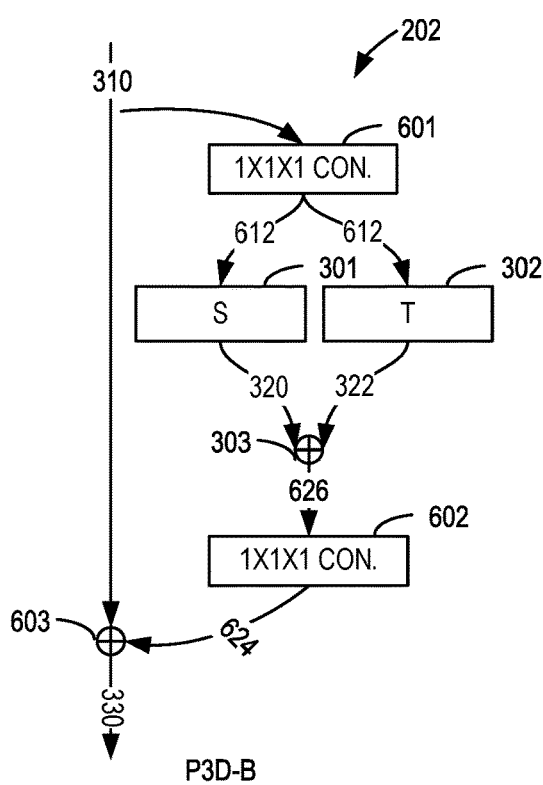
Figure 6C:
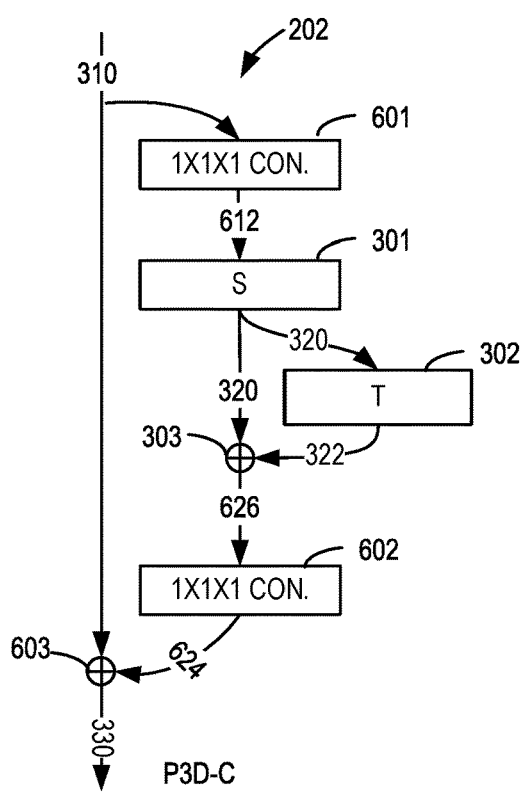

FIGS. 6A-6C show some examples of the processing kernel 202 having a bottleneck structure. The example of FIG. 6A is based on the structure of the processing kernel 202 in FIG. 5A. However, in the example of FIG. 6A, the processing kernel 202 further includes a convolutional sub-layer 601 which includes one or more 1×1×1 convolutional kernels for reducing the dimensionality of the input 310 from, for example, a first number to a second number, thereby obtaining the input 612 having a second number of dimensions. The convolutional sub-layer 601 may reduce the number of channels in the input 310 by combining different feature maps in the input 310 or data of frames in different channels, thereby reducing the dimensionality of the input 310.

The input 612 having a second number of dimensions is provided to the 2D convolutional kernel 301 to extract the first features 320 from the input 612 in the spatial dimension. In the series connection, the convolutional kernel 302 extracts the second features 322 from the first features 320 in the temporal dimension. The processing kernel 202 further includes a convolutional sub-layer 602 which includes a plurality of 1×1×1 convolutional kernels for increasing the dimensionality of the second features 322 from for example a third number to a fourth number, thereby obtaining an output 624 having the fourth number of dimensions. In some implementations, the dimensionality of the output 624 may be configured to be the same as the output 310. The output 624 and the input 310 of the processing kernel 202 are combined by the combiner 303 to generate the output 330 of the processing kernel 202.

In the example shown in FIG. 6B, on the basis of the structure shown in FIG. 5B, the processing kernel 202 further includes convolutional sub-layers 601 and 602 for reducing the dimensionality and increasing the dimensionality, respectively. Specifically, the convolutional kernels in the convolutional sub-layer 601 reduce the dimensionality of the input 310. Features 626 are obtained by combining the first features 320 and the second features 322 by the combiner 303 and are provided to the convolutional sub-layer 602. The convolutional sub-layer 602 increases the dimensionality of the combined features 626 to obtain an output 624. The processing kernel 202 further includes another combiner 603 for combining the output 624 and the input 310 of the processing kernel 202 to generate the output 330 of the processing kernel 202.

In the example shown in FIG. 6C, on the basis of the structure shown by FIG. 5C, the processing kernel 202 further includes convolutional sub-layers 601 and 602 for reducing the dimensionality and increasing the dimensionality, respectively. Specifically, the convolutional kernels in the convolutional sub-layer 601 reduce the dimensionality of the input 310. Features 626 are obtained by combining the first features 320 and the second features 322 by the combiner 303 and are provided to the convolutional sub-layer 602. The convolutional sub-layer 602 increases the dimensionality of the combined features 626 to obtain an output 624. The processing kernel 202 further includes another combiner 603 for combining the output 624 and the input 310 of the processing kernel 202 to generate the output 330 of the processing kernel 202.

In the examples of the processing kernels based on the bottleneck structure shown in FIG. 6A-FIG. 6C, the dimensionality of the input is reduced so that the convolutional kernels 301 and 302 can be learnt more easily during training and perform their processing more effectively during use.

The processing kernel 202 described above with reference to FIGS. 5A-5C and FIGS. 6A-6C may also be utilized in the learning network 122 in a similar way as the processing kernel 202 of FIG. 3A to FIG. 3C. In addition, as mentioned above with reference to FIGS. 3A-3C, based on direct or indirect influence between the convolutional kernels 301 and 302 and direct or indirect influence of their outputs on the output of the processing kernel 202, the convolutional kernels 301 and 302 may also have other variant connection structures. These variants may also be applied accordingly in similar embodiments as described with reference to FIGS. 5A-5C and FIGS. 6A-6C. The scope of the subject matter described herein is not limited in this regard.

The P3D processing kernel has been described above according to some implementations of the subject matter described herein. By using such processing kernel, while ensuring obtaining the spatial-temporal feature representation of the video clip, it is also possible to reduce the complexity of the learning network so that the training and use of the learning network may require less processing and storage resources. Furthermore, by ensuring the same efficiency, the learning network may be designed as deeper (e.g., including more convolutional layers) to obtain more accurate feature representations. It has been found through analysis that with the same dimensionality, the feature representation obtained based on P3D processing kernels is more accurate than the feature representation obtained by the conventional solutions.

Regarding the spatial 2D convolutional kernel in the processing kernel, a pre-training policy of utilizing existing 2D CNN networks may be employed to improve the training efficiency. In addition, the feature representation extracted by the learning network according to implementations of the subject matter described herein can be used as a general feature representation and may serve as a basis of subsequent different processing tasks for the input video clip. That is to say, the learning network according to implementations of the subject matter described herein may be used in various video processing tasks as a spatial-temporal feature representation extractor for the video clip. Such generalization may be specifically improved by mixing different types of processing kernels in the learning network.

In some implementations, for the learning network trained for feature extraction, in order to implement some specific video processing tasks, training data related to the specific tasks may be used to fine tune the parameters of that learning network, so that the extracted feature representation is more suitable for the corresponding tasks. Fine-tuning is usually less time-consuming and highly efficient as compared with a process of training a brand new dedicated learning network.

Example Processes

Figure 7:
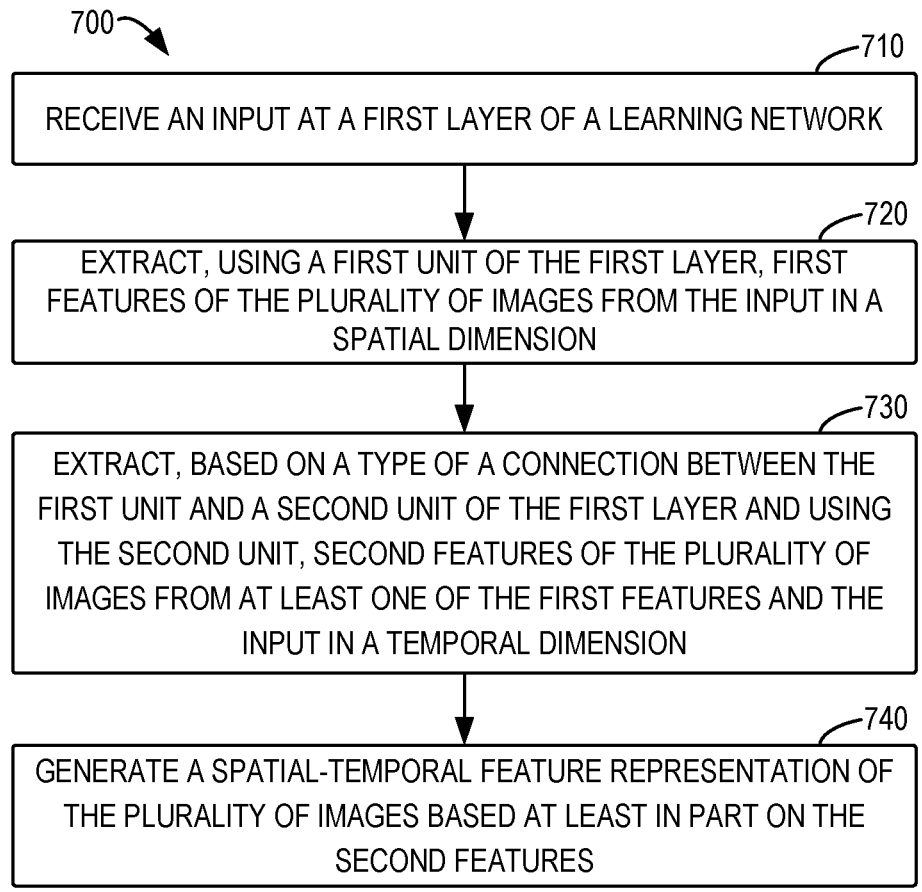
FIG. 7 illustrates a flowchart of a process for feature extraction in accordance with some implementations of the subject matter described herein.

FIG. 7 illustrates a flowchart of a process for feature extraction 700 in accordance with some implementations of the subject matter described herein. The process 700 may be implemented by the computing device 100, for example, may be implemented at the learning network module 122 in the memory 120 of the computing device 100. At 710, an input is received at a first layer of a learning network. The input comprises a plurality of images. At 720, first features of the plurality of images are extracted from the input in the spatial dimension using a first unit of the first layer. The first features characterize a spatial presentation of the plurality of images. At 730, second features of the plurality of images are extracted from at least one of the first features and the input in the temporal dimension, based on a connection type between the first unit and a second unit in the first layer and using the second unit. The second features at least characterize temporal changes across the plurality of images. At 740, a spatial-temporal feature representation of the plurality of images is generated based at least in part on the second features.

In some implementations, the plurality of images are images processed by a second layer of the learning network.

In some implementations, the type of the connection between the first and second units is selected from a group consisting of: a first series connection in which the second unit at least extracts the second features from the first features, a second series connection in which the second unit at least extracts the second features from the input, and a parallel connection in which the second unit extracts the second features from the input.

In some implementations, generating the spatial-temporal feature representation comprises: in response to the type of the connection being a second series connection or a parallel connection, generating the spatial-temporal feature representation by combining the first features and second features.

In some implementations, generating the spatial-temporal feature representation further comprises: generating the spatial-temporal feature representation further based on the input.

In some implementations, the input has a first number of dimensions, and extracting the first features from the input comprises: reducing the dimensions of the input from the first number to a second number; and extracting, using the first unit, the first features from the input having the second number of dimensions.

In some implementations, the second features have a third number of dimensions, and generating the spatial-temporal feature representation further comprises: increasing the dimensions of the second features from the third number to a fourth number; and generating the spatial-temporal feature representation based at least in part on the second features having the fourth number of dimensions.

In some implementations, generating the spatial-temporal feature representation further comprises: generating a first intermediate feature representation for the first layer based at least in part on the second features; and extracting third features of the plurality of images from the first intermediate feature representation in the spatial dimension using a third unit of a third layer in the learning network, the third features characterizing the spatial presentation of the plurality of images; extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and generating the spatial-temporal feature representation based at least in part on the fourth features.

In some implementations, at least one unit of the first and second units comprises a convolutional filter.

Example Implementations

Some example implementation modes of the subject matter disclosed here are listed hereinafter.

In one aspect, the subject matter disclosed here provides a computer-implemented method, comprising: receiving an input at a first layer of a learning network, the input comprising a plurality of images; extracting, using a first unit of the first layer, first features of the plurality of images from the input in a spatial dimension, the first features characterizing a spatial presentation of the plurality of images; extracting, based on a type of a connection between the first unit and a second unit of the first layer and using the second unit, second features of the plurality of images from at least one of the first features and the input in a temporal dimension, the second features at least characterizing temporal changes across the plurality of images; and generating a spatial-temporal feature representation of the plurality of images based at least in part on the second features.

In some implementations, the plurality of images are images processed by a second layer of the learning network.

In some implementations, the type of the connection between the first and second units is selected from a group consisting of: a first series connection in which the second unit at least extracts the second features from the first features, a second series connection in which the second unit at least extracts the second features from the input, and a parallel connection in which the second unit extracts the second features from the input.

In some implementations, generating the spatial-temporal feature representation comprises: in response to the type of the connection being a second series connection or a parallel connection, generating the spatial-temporal feature representation by combining the first features and second features.

In some implementations, generating the spatial-temporal feature representation further comprises: generating the spatial-temporal feature representation further based on the input.

In some implementations, the input has a first number of dimensions, and extracting the first features from the input comprises: reducing the dimensions of the input from the first number to a second number; and extracting, using the first unit, the first features from the input having the second number of dimensions.

In some implementations, the second features have a third number of dimensions, and generating the spatial-temporal feature representation further comprises: increasing the dimensions of the second features from the third number to a fourth number; and generating the spatial-temporal feature representation based at least in part on the second features having the fourth number of dimensions.

In some implementations, generating the spatial-temporal feature representation further comprises: generating a first intermediate feature representation for the first layer based at least in part on the second features; and extracting third features of the plurality of images from the first intermediate feature representation in the spatial dimension using a third unit of a third layer in the learning network, the third features characterizing the spatial presentation of the plurality of images; extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and generating the spatial-temporal feature representation based at least in part on the fourth features.

In some implementations, at least one unit of the first and second units comprises a convolutional filter.

In another aspect, the subject matter described herein provides a device, comprising: a processing unit; and a memory coupled to the processing unit and having instructions stored thereon which, when executed by the processing unit, causing the device to perform acts comprising: receiving an input at a first layer of a learning network, the input comprising a plurality of images; extracting, using a first unit of the first layer, first features of the plurality of images from the input in a spatial dimension, the first features characterizing a spatial presentation of the plurality of images; extracting, based on a type of a connection between the first unit and a second unit of the first layer and using the second unit, second features of the plurality of images from at least one of the first features and the input in a temporal dimension, the second features at least characterizing temporal changes across the plurality of images; and generating a spatial-temporal feature representation of the plurality of images based at least in part on the second features.

In some implementations, the plurality of images are images processed by a second layer of the learning network.

In some implementations, the type of the connection between the first and second units is selected from a group consisting of: a first series connection in which the second unit at least extracts the second features from the first features, a second series connection in which the second unit at least extracts the second features from the input, and a parallel connection in which the second unit extracts the second features from the input.

In some implementations, generating the spatial-temporal feature representation comprises: in response to the type of the connection being a second series connection or a parallel connection, generating the spatial-temporal feature representation by combining the first features and second features.

In some implementations, generating the spatial-temporal feature representation further comprises: generating the spatial-temporal feature representation further based on the input.

In some implementations, the input has a first number of dimensions, and extracting the first features from the input comprises: reducing the dimensions of the input from the first number to a second number; and extracting, using the first unit, the first features from the input having the second number of dimensions.

In some implementations, the second features have a third number of dimensions, and generating the spatial-temporal feature representation further comprises: increasing the dimensions of the second features from the third number to a fourth number; and generating the spatial-temporal feature representation based at least in part on the second features having the fourth number of dimensions.

In some implementations, generating the spatial-temporal feature representation further comprises: generating a first intermediate feature representation for the first layer based at least in part on the second features; and extracting third features of the plurality of images from the first intermediate feature representation in the spatial dimension using a third unit of a third layer in the learning network, the third features characterizing the spatial presentation of the plurality of images; extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and generating the spatial-temporal feature representation based at least in part on the fourth features.

In some implementations, at least one unit of the first and second units comprises a convolutional filter.

In a further aspect, the subject matter described herein provides a computer program product stored on a computer-readable medium and comprising machine-executable instructions which, when executed by a device, enabling the device to: receive an input at a first layer of a learning network, the input comprising a plurality of images; extract, using a first unit of the first layer, first features of the plurality of images from the input in a spatial dimension, the first features characterizing a spatial presentation of the plurality of images; extract, based on a type of a connection between the first unit and a second unit of the first layer and using the second unit, second features of the plurality of images from at least one of the first features and the input in a temporal dimension, the second features at least characterizing temporal changes across the plurality of images; and generate a spatial-temporal feature representation of the plurality of images based at least in part on the second features.

In some implementations, the plurality of images are images processed by a second layer of the learning network.

In some implementations, the type of the connection between the first and second units is selected from a group consisting of: a first series connection in which the second unit at least extracts the second features from the first features, a second series connection in which the second unit at least extracts the second features from the input, and a parallel connection in which the second unit extracts the second features from the input.

In some implementations, generating the spatial-temporal feature representation comprises: in response to the type of the connection being a second series connection or a parallel connection, generating the spatial-temporal feature representation by combining the first features and second features.

In some implementations, generating the spatial-temporal feature representation further comprises: generating the spatial-temporal feature representation further based on the input.

In some implementations, the input has a first number of dimensions, and extracting the first features from the input comprises: reducing the dimensions of the input from the first number to a second number; and extracting, using the first unit, the first features from the input having the second number of dimensions.

In some implementations, the second features have a third number of dimensions, and generating the spatial-temporal feature representation further comprises: increasing the dimensions of the second features from the third number to a fourth number; and generating the spatial-temporal feature representation based at least in part on the second features having the fourth number of dimensions.

In some implementations, generating the spatial-temporal feature representation further comprises: generating a first intermediate feature representation for the first layer based at least in part on the second features; and extracting third features of the plurality of images from the first intermediate feature representation in the spatial dimension using a third unit of a third layer in the learning network, the third features characterizing the spatial presentation of the plurality of images; extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and generating the spatial-temporal feature representation based at least in part on the fourth features.

In some implementations, at least one unit of the first and second units comprises a convolutional filter.

In a further aspect, the subject matter described herein provides a computer-readable medium having computer-executable instructions stored thereon which, when executed by a device, cause the device to perform the method in the above aspect.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
receiving an input at a first layer of a learning network, the input comprising a plurality of images;
extracting, using a first unit of the first layer, first features of the plurality of images from the input in a spatial dimension, the first features characterizing a spatial presentation of the plurality of images;
selecting a type of a connection between the first unit and a second unit of the first layer from a group comprising a first series connection type, a second series connection type, or a parallel connection type;
extracting second features of the plurality of images from at least one of the first features and the input in a temporal dimension, the second features at least characterizing temporal changes across the plurality of images, wherein the second unit extracts the second features, and extracting the second features comprises:
extracting, upon determining the type of the connection is the first series connection type, at least the second features from the first features;
extracting, upon determining the type of the connection is the second series connection type, at least the second features from the input; or
extracting, upon determining the type of the connection is the parallel connection type, the second features from the input; and generating a spatial-temporal feature representation of the plurality of images based at least in part on the second features.

2. The method of claim 1, wherein the plurality of images are images processed by a second layer of the learning network.

3. The method of claim 1, wherein generating the spatial-temporal feature representation comprises:
in response to the type of the connection being a second series connection of the second series connection type or a parallel connection of the parallel connection type, generating the spatial-temporal feature representation by combining the first features and second features.

4. The method of claim 1, wherein generating the spatial-temporal feature representation further comprises:
generating the spatial-temporal feature representation further based on the input.

5. The method of claim 1, wherein the input has a first number of dimensions, and extracting the first features from the input comprises:
reducing the dimensions of the input from the first number to a second number; and
extracting, using the first unit, the first features from the input having the second number of dimensions.

6. The method of claim 5, wherein the second features have a third number of dimensions, and generating the spatial-temporal feature representation further comprises:
increasing the dimensions of the second features from the third number to a fourth number; and
generating the spatial-temporal feature representation based at least in part on the second features having the fourth number of dimensions.

7. The method of claim 1, wherein generating the spatial-temporal feature representation further comprises:
generating a first intermediate feature representation for the first layer based at least in part on the second features; and
extracting third features of the plurality of images from the first intermediate feature representation in the spatial dimension using a third unit of a third layer in the learning network, the third features characterizing the spatial presentation of the plurality of images;
extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and
generating the spatial-temporal feature representation based at least in part on the fourth features.

8. A device, comprising:
a processing unit; and
a memory coupled to the processing unit and having instructions stored thereon which, when executed by the processing unit, causing the device to perform acts comprising:
receiving an input at a first layer of a learning network; the input comprising a plurality of images;
extracting, using a first unit of the first layer, first features of the plurality of images from the input in a spatial dimension, the first features characterizing a spatial presentation of the plurality of images;
selecting a type of a connection between the first unit and a second unit of the first layer from a group comprising of a first series connection type, a second series connection type, or a parallel connection type;
extracting second features of the plurality of images from at least one of the first features and the input in a temporal dimension, the second features at least characterizing temporal changes across the plurality of images, wherein the second unit extracts the second features, and extracting the second features comprises:
extracting, upon determining the type of the connection is the first series connection type, at least the second features from the first features;
extracting, upon determining the type of the connection is the second series connection type, at least the second features from the input; or
extracting, upon determining the type of the connection is the parallel connection type, the second features from the input; and
generating a spatial-temporal feature representation of the plurality of images based at least in part on the second features.

9. The device of claim 8, wherein the plurality of images are images processed by a second layer of the learning network.

10. The device of claim 8, wherein generating the spatial-temporal feature representation comprises:
in response to the type of the connection being a second series connection of the second series connection type or a parallel connection of the parallel connection type, generating the spatial-temporal feature representation by combining the first features and second features.

11. The device of claim 8, wherein generating the spatial-temporal feature representation further comprises:
generating the spatial-temporal feature representation further based on the input.

12. The device of claim 8, wherein generating the spatial-temporal feature representation further comprises:
generating a first intermediate feature representation for the first layer based at least in part on the second features; and
extracting third features of the plurality of images from the first intermediate feature representation in the spatial dimension using a third unit of a third layer in the learning network, the third features characterizing the spatial presentation of the plurality of images;
extracting, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and
generating the spatial-temporal feature representation based at least in part on the fourth features.

13. A computer program product being stored on a computer-readable medium and comprising machine-executable instructions which, when executed by a device, cause the device to:
receive an input at a first layer of a learning network, the input comprising a plurality of images;
extract, using a first unit of the first layer, first features of the plurality of images from the input in a spatial dimension, the first features characterizing a spatial presentation of the plurality of images;
select a type of a connection between the first unit and a second unit of the first layer from a group comprising of a first series connection type, a second series connection type, or a parallel connection type;
extract second features of the plurality of images from at least one of the first features and the input in a temporal dimension, the second features at least characterizing temporal changes across the plurality of images, wherein the second unit extracts the second features, and extracting the second features comprises:
  extracting, upon determining the type of the connection is the first series connection type, at least the second features from the first features;
  extracting, upon determining the type of the connection is the second series connection type, at least the second features from the input; or
  extracting, upon determining the type of the connection is the parallel connection type, the second features from the input; and
generate a spatial-temporal feature representation of the plurality of images based at least in part on the second features.

14. The computer program product of claim 13, the machine-executable instructions to generate the spatial-temporal feature representation further comprising instructions which, when executed by the device, cause the device to:
  in response to the type of the connection being a second series connection of the second series connection type or a parallel connection of the parallel connection type, generate the spatial-temporal feature representation by combining the first features and second features.

15. The computer program product of claim 13, the machine-executable instructions to generate the spatial-temporal feature representation further comprising instructions which, when executed by the device, cause the device to:
  generate the spatial-temporal feature representation further based on the input.

16. The computer program product of claim 13, wherein the input has a first number of dimensions, and the machine-executable instructions to extract the first features from the input comprises instructions which, when executed by the device, cause the device to:
  reduce the dimensions of the input from the first number to a second number; and
  extract, using the first unit, the first features from the input having the second number of dimensions.

17. The computer program product of claim 16, wherein the second features have a third number of dimensions, and the machine-executable instructions to generate the spatial-temporal feature representation further comprises instructions which, when executed by the device, cause the device to:
  increase the dimensions of the second features from the third number to a fourth number; and
  generate the spatial-temporal feature representation based at least in part on the second features having the fourth number of dimensions.

18. The computer program product of claim 13, the machine-executable instructions to generate the spatial-temporal feature representation further comprising instructions which, when executed by the device, cause the device to:
  generate a first intermediate feature representation for the first layer based at least in part on the second features; and
  extract third features of the plurality of images from the first intermediate feature representation in the spatial dimension using a third unit of a third layer in the learning network, the third features characterizing the spatial presentation of the plurality of images;
  extract, based on a type of a connection between the third unit and a fourth unit of the third layer and using the fourth unit, fourth features of the plurality of images from the third features or the first intermediate feature representation in the temporal dimension, the fourth features at least characterizing temporal changes across the plurality of images, the type of the connection between the third and fourth units being different from the type of the connection between the first and second units; and
  generate the spatial-temporal feature representation based at least in part on the fourth features.

19. The computer program product of claim 13, wherein the plurality of images are images processed by a second layer of the learning network.

* * * * *